May 8, 1928. Re. 16,958

J. W. ORROCK

VENTILATING SECTIONAL SMOKE JACK

Original Filed Aug. 27, 1925 3 Sheets-Sheet 1

Inventor

J. W. Orrock,

By

Attorney

WITNESSES:-

Chas. L. Griebauer

Emory R. Groff

May 8, 1928. Re. 16,958

J. W. ORROCK

VENTILATING SECTIONAL SMOKE JACK

Original Filed Aug. 27, 1925 3 Sheets-Sheet 2

Inventor

J. W. Orrock,

By D. Rochaud

Attorney

WITNESSES:-

Chas. L. Grisbauer

Emory T. Groff

May 8, 1928.

Re. 16,958

J. W. ORROCK

VENTILATING SECTIONAL SMOKE JACK

Original Filed Aug. 27, 1925 3 Sheets-Sheet 3

Witnesses:-
Chas. L. Griesbower
Emory B. Groff

Inventor
J. W. Orrock,
By D. Wolcan Jr.
Attorney

Reissued May 8, 1928. Re. 16,958

UNITED STATES PATENT OFFICE.

JOHN WILSON ORROCK, OF MONTREAL, QUEBEC, CANADA, ASSIGNOR OF ONE-HALF TO JOHN M. R. FAIRBAIRN, OF WESTMOUNT, QUEBEC, CANADA.

VENTILATING SECTIONAL SMOKE JACK.

Original No. 1,581,979, dated April 20, 1926, Serial No. 52,949, filed August 27, 1925. Application for reissue filed February 12, 1927. Serial No. 167,852.

This invention relates to smoke jacks adapted for use in round houses, engine houses and the like to assist the escape of smoke from the stacks of locomotives and the escape of steam when a boiler is blown off.

One of the objects of the invention is to provide a jack consisting of flat sections made of any suitable material that may be easily handled, and can be shipped in small bulk, thereby to facilitate transportation and assembly on the job. This construction has the advantage that many pieces are alike and interchangeable, and when put together form a box-like structure which is very strong, stable and durable thereby reducing installation and maintenance costs to a minimum. Also, the sectional design simplifies the manufacture, enables the use of standard material, and involves less risk, breakage, and damage in handling.

A further object is to provide a sectional ventilating smoke jack which not only conducts the smoke or steam from the stack of a locomotive directly to the outside of the house or other enclosure, but also assists in ventilating the space beneath the roof due to the fact that two sides of the interior portion of the jack form ventilating openings located substantially at roof or ceiling level.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Similar reference characters designate corresponding parts throughout the several figures of the drawings.

Figure 1:
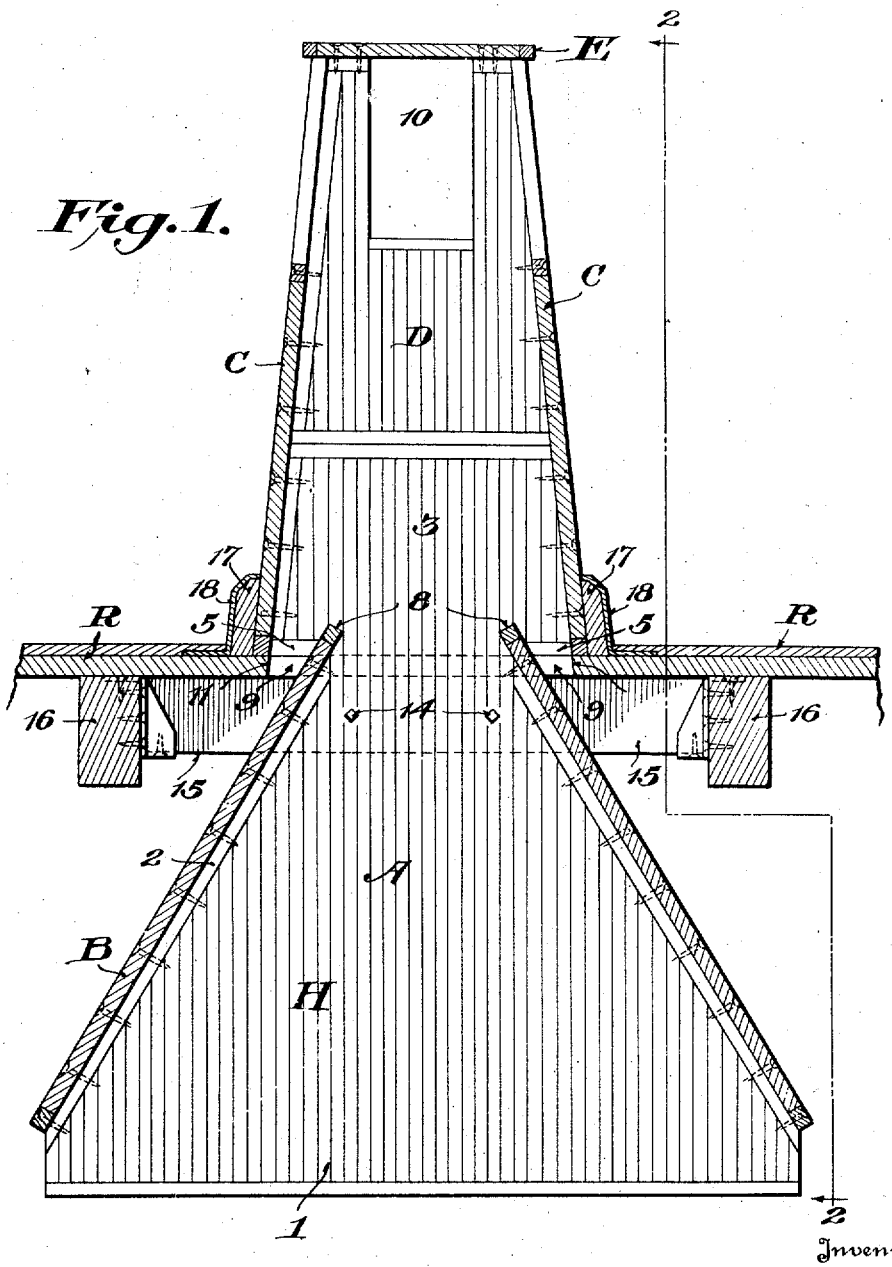
Figure 1 is a vertical sectional view of the improved construction.
Figure 2:
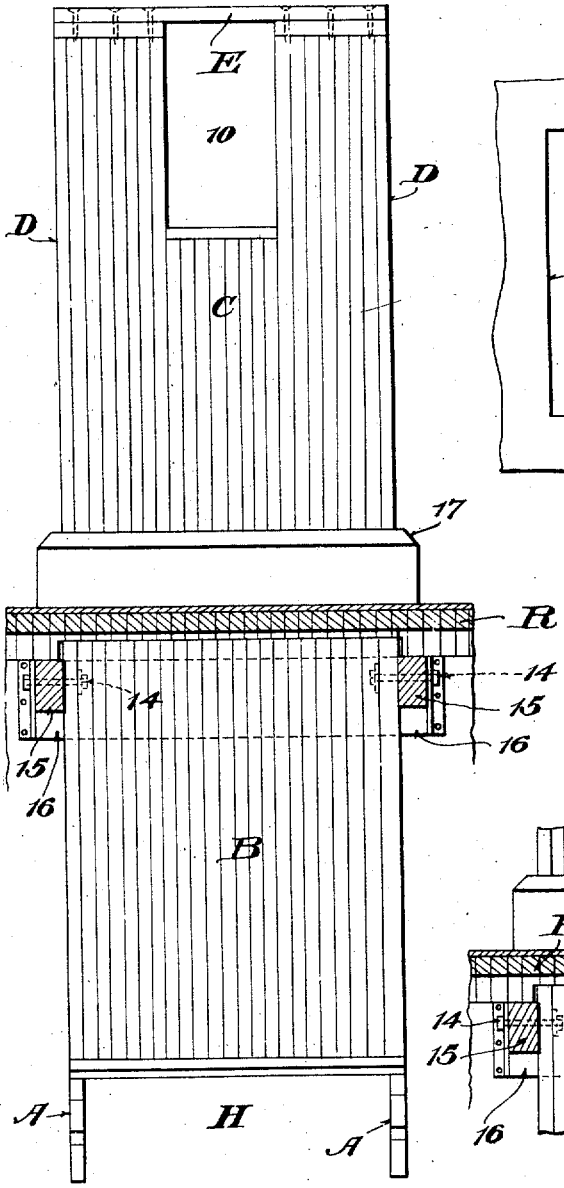
Figure 2 is a vertical sectional view taken on the line 2—2 of Fig. 1, showing the sides of the jack in elevation.

The present invention relates particularly to a ventilating sectional smoke stack construction comprising sections adapted to be made up in the shop and then shipped to the point of installation, and has in view certain improvements on my former Patents Nos. 1,150,878, dated August 24, 1915 and 1,314,016 dated August 26, 1919. In the respect that the present invention contemplates a sectional ventilating smoke jack the present invention represents a carrying forward of the idea shown in my Patent No. 1,314,016 aforesaid.

By reference to the accompanying drawings it will be observed that one of the distinctive features of the present construction resides in providing adequate ventilating openings located substantially at roof or ceiling level thereby to more adequately provide for the removal or carrying off of the gases collected beneath the roof due to the ejector action set up by the forced or induced draft incident to the rush of smoke or steam passing through the interior hood portion of the device. A further feature resides in forming the main side sections in such a way that they take a direct bearing on the roof of the structure on which the smoke jack is installed.

As will be observed from Figs. 4 to 8 inclusive the present construction includes in its organization the main side-sections A, the end-sections B, the exterior flue-sections C, the extension sections D for the main side-sections, and the top or cover piece E. The main side sections A preferably consist of a body 1 having the upwardly inclined side edges 2 which converge toward the cap portion 3 of said section and intersect the bottom edge of the cap portion 3 at a point inside of the outer corners 4 thereof, thereby to provide the roof engaging shoulders 5. The side edges of the cap portion 3 are also inclined upwardly but at less pitch than the side edges 2, thus providing the main section A with two pairs of inclined, and convergently related side edges, one pair arranged below the roof and the other above the same.

The end sections B are preferably of substantially rectangular formation and the side edges 6 thereof are adapted to be fastened to the inclined edges 2 of the main side sections 1. The upper corners of the end sections are notched or recessed as indicated at 7 thereby to permit the upper edges 8 of the end-sections to project upwardly above the level of the roof R as shown in Fig. 1. The end-sections B are duplicate and interchangeable for either end of the main side sections, and are therefore of standard size and design.

The cap portions 3 of the main side-sections 1 which project above the roof R cooperate with the side-sections C and the extension-section D to provide an exhaust flue which communicates with the hood H formed by the sides A and the ends B, and also with the relatively large ventilating openings 9 located substantially at roof or ceiling level and communicating with the space under the roof R.

The flue forming sections C and D are preferably provided with the openings 10 so that when the cover piece E is applied thereto the smoke, steam or other gases may readily exhaust yet at the same time the cover piece E will prevent rain or the like falling into the building through the smoke jack.

In connection with the cap portion 3 of the main side sections, and the extension sections D, it will be observed that the sides thereof are inclined upwardly thereby to provide an exhaust flue which tapers toward the discharge end throughout one of its dimensions, thus having the effect of stimulating ejector action to carry off gases or the like accumulated beneath the roof.

Figure 3:
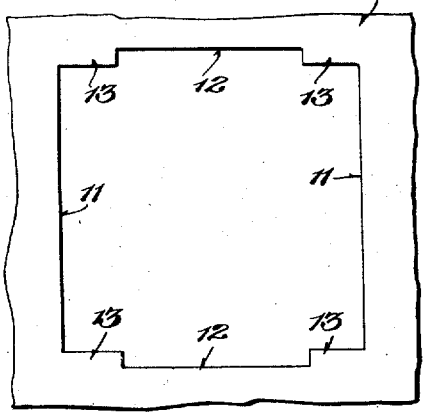
Figure 3 is a plan view of the opening cut in the roof of the house or other structure.

In installing the device, which as previously indicated, may be shipped in knocked-down form, due to its sectional construction, it is proposed to cut a hole 11 in the roof R, the sides 12 of the hole being provided with the corner abutments 13 for cooperating with the shoulders 5 of the main side sections A. After the hole 11 is cut in accordance with the configuration shown in Fig. 3 the side sections 1 may be lifted through the opening and then shifted laterally until the shoulders 5 rest upon the corner abutments 13, thereby supporting the main sections directly on the roof. To assist in securing the side sections A the same may be bolted as indicated at 14 (Fig. 1) to the cross beam 15 carried by the rafters 16. Thus, in addition to supporting the side sections directly on the outside or top of the roof the fastenings 14 may be utilized to insure permanency and stability. In installing the device however, the shoulders 5 and corner abutments 13 have the advantage of supporting the side sections A while assembling the hood H. If desired the fastenings 14 may be dispensed with entirely, the same being utilized merely for the sake of providing additional support and also distributing the weight of the hood to the rafters 16 where that is desirable.

The sections C and D which cooperate with the cap portion 3 of the main side sections A are preferably secured together at their meeting edges by nails, screws or equivalent fastenings, and to provide a practical and durable connection between the flue and the outside of the roof a collar 17 may be built about the lower end of the member C and the cap or head portion 3. This collar may be fitted with a galvanized iron or other flashing 18 to provide a water-tight connection between the flue and the roof.

Figure 9:
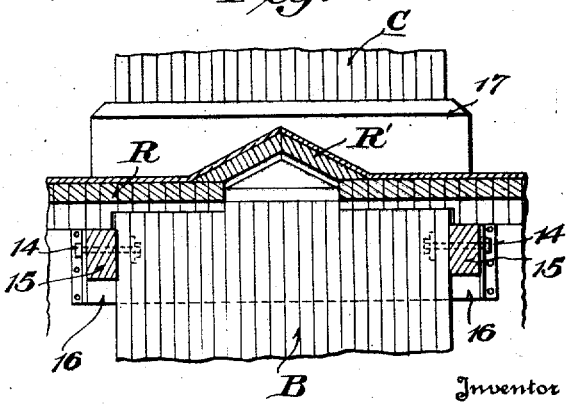
Figure 9 is a detailed view illustrating the change necessary to accommodate a roof vent when encountered.
Figure 4:
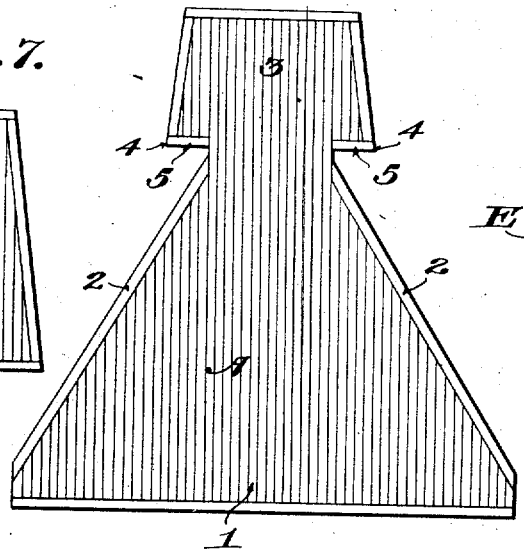
Figure 4 is a detail plan view of one of the main side sections.
Figure 7:
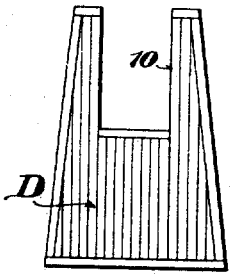
Figure 7 is a detail plan view of one of the extension sections for the main side sections.
Figure 8:
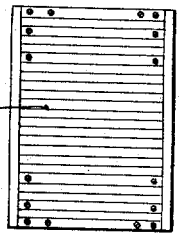
Figure 8 is a plan view of the top or cover.
Figure 5:
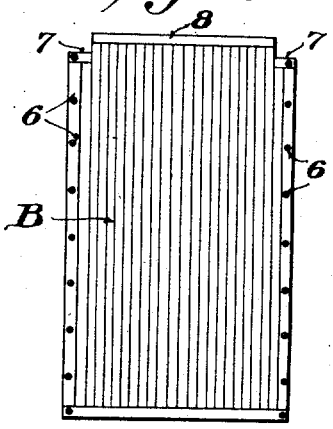
Figure 5 is a detail plan view of one of the end sections.
Figure 6:
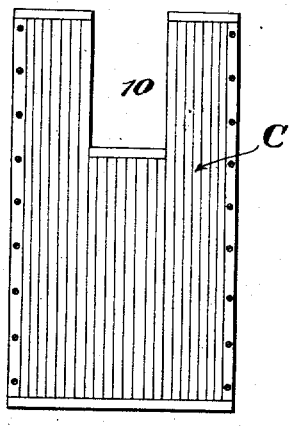
Figure 6 is a detail plan view of one of the exterior flue sections.

As shown in Fig. 9 the collar 17 and the side of the jack may be cut to connect with the roof vent R′ when encountered. This however is a mere expedient of installation incident to certain types of roof construction and does not alter the function or structural features of the invention.

A feature of practical importance in the present invention is the structural one, regardless of the material of which the smoke jack is made, of the top flue or stack C—D arranged over and above the roof opening and the hood H arranged below the hood and having its two opposite walls B—B extending into the roof opening and spaced from the adjacent edges of said roof opening thereby to form two opposite ventilating openings. This form of construction provides two ventilating openings in the most advantageous locations in order to discharge therethrough any accumulations of smoke or gas which otherwise might become trapped immediately under the roof, while at the same time permitting the other side walls A—D of the jack to be united or joined and substantially continuous from top to bottom of the jack. Furthermore, it will be observed that the supporting cross beams 15 and the fastenings 14, though an optional feature of the invention, provide a stable supporting means carried with the roof structure which assists in strongly suspending the hood proper from the roof structure so that the particular feature above described may be embodied in the jack construction in a thoroughly practicable manner.

From the foregoing it will be apparent that the present sectional type of construction carries forth the idea of my former Patent No. 1,314,016 supra in a thoroughly practical and effective manner. The various sections of the jack may be readily made in shops or other convenient places and readily transported to remote points of installation where only the services of a carpenter or other workman are required to erect and assemble.

Without further description it is thought that the features and advantages of the present invention will be readily apparent to those skilled in the art, and it will of course be understood that changes in the form, proportion and minor details of construction may be resorted to, without departing from the spirit of the invention and scope of the appended claims. In that connection it may be pointed out that the present construction embodies features that make it possible to use other materials than wood, such for example as asbestos, sheets of concrete, metal and the like. Thus, while the drawings illustrate a wood jack of mill type construction, it will be understood that the embodiment shown merely is an example of one way of carrying the invention into effect, the construction being such that any other material may be selected.

I claim:—

1. In a ventilating smoke jack, the combination with a roof having an opening, of a pair of main sections having intermediate shoulder portions adapted to rest upon the side edges of the opening in the roof, end sections carried by the main sections and arranged to provide vent ports between the end members and the roof, and an exhaust flue cooperating with the main sections and communicating with the interior of the structure through said vent ports.

2. In a ventilating smoke jack, the combination with a roof having an opening, of a pair of main sections having intermediate shoulder portions adapted to rest upon the side edges of the opening in the roof, end sections carried by the main sections and projecting through the opening in the roof to provide vent ports between the end members and the roof, and an exhaust flue cooperating with the main sections and communicating with the interior of the structure through said vent ports.

3. In a ventilating smoke jack, the combination with a roof having an opening, of an interior hood having converging end walls and intermediate shoulder portions adapted to engage with the roof adjacent said opening and the diverging sides of said hood being spaced from the sides of the opening lying at right angles to the side of the opening engaged by the main section, and an exhaust flue assembled about the portion of the hood which projects exteriorly of the roof.

4. In a ventilating smoke jack, the combination with a roof having an opening, of side sections having two pairs of inclined side edges disposed respectively above and below the roof level, and sections cooperating with said pairs of inclined sides respectively to form an interior converging exhaust hood and an exterior tapering exhaust flue, and said side sections which form the hood being spaced from the roof opening to provide vent ports communicating with the exhaust flue.

5. In a ventilating smoke jack, the combination with a roof having an opening, of side sections having two pairs of convergently related side edges having an intermediate roof engaging shoulder therebetween, end sections cooperating with the lower pair of converging side edges to provide an interior hood, and said end sections being spaced from the edges of the opening to provide vent ports at roof level, and flue sections assembled above the roof opening, and certain of said sections being secured to the other pair of inclined side edges of the side forming sections thereby to provide a tapering exhaust flue.

6. In a ventilating smoke jack, the combination with a roof having an opening, of side sections having inclined edges and end sections fitted to said inclined sides and comprising an interior hood, an exterior cap portion formed on said side sections and having inclined edges of less pitch than the edges of the side sections and said end sections projecting through the roof opening but spaced from the edges thereof to provide vent ports at roof level, flue forming sections comprising an extension member for the cap portion and having side edges conforming to the pitch of the edges of the cap portion, and other flue forming sections secured to the tapering edges of said cap portion and the extension section.

7. In a ventilating smoke jack, the combination with a roof having an opening, of a hood including converging end walls and a shouldered portion adapted to engage with the opening and projecting exteriorly of the roof while said converging sides thereof are spaced from other sides of the opening to provide vent ports at ceiling level, and an exhaust flue built about and cooperating with the exteriorly projecting portion of the hood.

8. In a ventilating smoke jack, the combination with a roof having an opening, of a hood comprising side sections including portions adapted to lie below and above the roof and having inclined sides, end members fitted to the inclined edges of the portion of the side sections lying below the roof and spaced from the edge of the opening to provide vent ports, and flue forming sections fitted to the inclined edges of the portion of the side sections which project above the roof level thereby to provide a tapering exhaust flue.

9. In a ventilating smoke jack the combination with the roof having an opening formed with corner abutments, of side sections having intermediate shoulder portions adapted to rest upon said corner abutments, end sections carried by the side sections beneath the shoulder portions and spaced from the edges of the opening to provide vent ports at roof level, and flue sections assembled about the portion of the side sections which project above the roof level.

10. In a knock down ventilating smoke jack construction, the combination with main side sections having intermediate roof engaging shoulders, end sections adapted to be secured to said side sections having their upper ends spaced inwardly from the outer corners of said shoulders and also projecting above the plane thereof, and flue forming sections cooperating with the portion of the side sections above the said shoulders.

11. In a ventilating smoke jack, the combination with the roof having an opening therein, of a flue arranged over and above the roof opening, and a hood arranged below the roof and having two of its walls extending into the roof opening and spaced from the adjacent edges thereof to form two opposite ventilating openings, and its other two walls joined with and forming substantial continuations of two opposite side walls of the flue.

12. In a ventilating smoke jack, the combination with a roof having an opening therein, of a flue arranged over and above the roof opening, supporting means secured to and carried with the roof structure, and a hood member connecting with said supporting means and disposed below the roof structure, said hood having two of its opposite walls extending into the roof opening and spaced from the adjacent edges thereof to form two opposite ventilating openings, and having its other two walls joined with and forming substantial continuations of two opposite sides of the flue.

In testimony whereof I hereunto affix my signature.

J. W. ORROCK.